United States Patent
Durand et al.

(10) Patent No.: US 7,752,270 B2
(45) Date of Patent: Jul. 6, 2010

(54) LINKING SOUNDS AND EMOTICONS

(75) Inventors: Terry Durand, Roswell, GA (US); Fulvio Cenciarelli, Suwanee, GA (US); Jeffrey Mikan, Cumming, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 1236 days.

(21) Appl. No.: 10/761,773

(22) Filed: Jan. 21, 2004

(65) Prior Publication Data

US 2005/0160149 A1 Jul. 21, 2005

(51) Int. Cl.
*G06F 15/16* (2006.01)

(52) U.S. Cl. .................. 709/206; 709/204; 709/207

(58) Field of Classification Search .......... 709/204–207
See application file for complete search history.

(56) References Cited

U.S. PATENT DOCUMENTS

| | | | |
|---|---|---|---|
| 6,064,383 A | 5/2000 | Skelly | |
| 6,463,467 B1 * | 10/2002 | Mages et al. | 709/218 |
| 6,629,793 B1 | 10/2003 | Miller | |
| 6,963,839 B1 * | 11/2005 | Ostermann et al. | 704/260 |
| 7,091,976 B1 * | 8/2006 | Ostermann et al. | 345/473 |
| 2003/0225846 A1 * | 12/2003 | Heikes et al. | 709/207 |
| 2003/0225848 A1 * | 12/2003 | Heikes et al. | 709/207 |
| 2004/0024822 A1 * | 2/2004 | Werndorfer et al. | 709/206 |
| 2004/0215728 A1 * | 10/2004 | Isaacs et al. | 709/206 |
| 2005/0204309 A1 * | 9/2005 | Szeto | 715/811 |
| 2008/0040227 A1 * | 2/2008 | Ostermann et al. | 705/14 |
| 2009/0031000 A1 * | 1/2009 | Szeto | 709/207 |

* cited by examiner

*Primary Examiner*—Nathan Flynn
*Assistant Examiner*—Joshua Joo
(74) *Attorney, Agent, or Firm*—Moazzam & Associates, LLC

(57) ABSTRACT

A method and apparatus for linking sounds and emoticons to allow a recipient of a message containing an emoticon to hear audio associated with the emoticon. In one aspect of the invention, a first user or sender establishes a link or association between the emoticon being sent and a sound file to be associated with that particular emoticon. The emoticon is then transmitted from the sender to the recipient along with the link or association such that the recipient can hear the audio when the emoticon is displayed.

13 Claims, 5 Drawing Sheets

LINKING SOUNDS AND EMOTICONS

BACKGROUND OF THE INVENTION

1. Field of Invention

The present invention relates generally to communications and in particular relates to communicating text files and associating sound files with the text files.

With the advance of electronic mail (e-mail), it has become common to transmit so-called emotional icons, otherwise known as emoticons, within messages. Such emoticons typically consist of one or more keyboard characters which can be understood to convey voice inflections, facial expressions, gestures, etc. For example, the ubiquitous "smiley face,":-) is often transmitted to express happiness. As is well understood, this emoticon is constructed from a colon character, a dash character and a close parentheses character. There are a good number of such emoticons that can be constructed from ordinary keyboard characters.

2. Description of Related Art

U.S. Pat. No. 6,629,793 discloses an emoticon keyboard for generating emoticons and abbreviations with specialized keys. As is described in this patent, and as is well known generally, it is common for certain software application programs to translate the text emoticon into a graphical representation. For example, the ubiquitous :) is often depicted by software programs as an upright face with two eyes and a smiling mouth (a smiley face).

While it has been known in the art to convert textual emoticon symbols into graphic representations, it has heretofore not been known to also play any sort of audio in response to the particular emoticon being displayed or transmitted. Accordingly, the present invention is directed to a method for linking sounds and emoticons to allow a first user or sender to send an emoticon to a recipient or second user such that the recipient sees the emoticon and hears a sound associated with it.

SUMMARY OF THE INVENTION

Briefly described, the present invention comprises a method and apparatus for linking sounds and emoticons to allow a recipient of a message containing an emoticon to hear audio associated with the emoticon. In one aspect of the invention, the first user or sender establishes a link or association between the emoticon being sent and a sound file to be associated with that particular emoticon. The emoticon is then transmitted from the sender to the recipient along with the link or association such that the recipient can hear the audio when the emoticon is displayed.

In another aspect, the invention as disclosed herein involves the use of a communications server which can create the link or association between the emoticon and a sound file. This can be done more or less automatically. For example, the server can be programmed to link a particular sound file with a particular emoticon for every sender. Alternatively, the server can be programmed to allow different sound files to be associated with the same emoticon, depending upon the preferences of the sender. Thus, a first sender or user can choose a particular sound file to be associated or linked with an emoticon, while a different sender or user can choose a different sound file to be automatically associated or linked with an emoticon anytime that particular sender sends a message containing that emoticon.

Thus, as just described above, the linking or association can be made dynamically or automatically. The linking can be done by the end user or sender, can be made automatically at the sender's device prior to uploading it along with the message containing the emoticon to a network server, or can be made at the network server.

Stated another way, the present invention comprises a method and apparatus that uses an electronic communications network, in which a sender can send a message to a recipient, with the network including a server for facilitating communications between the sender and the recipient. Preferably, the method comprises the steps of linking a sound file to an emoticon contained in a sender-generated message, forwarding the emoticon and its link to the sound file to the recipient, and at the recipient, displaying the emoticon and audibly playing the sound file linked to the emoticon.

In one form the step of linking comprises making a dynamic association, established by the sender, for that particular message being sent. In another form the step of linking comprises automatically generating a link according to the particular emoticon being sent. In yet another form the step of linking comprises automatically generating a link according to the combination of the particular emoticon being sent and the particular recipient.

In one manner of practicing the invention the step of linking is performed by the sender. Alternatively, in another manner of practicing the invention the step of linking is performed by the server.

One way of carrying out the invention comprises linking or associating a sound file with an emoticon, without necessarily attaching a sound file to the electronic message containing the emoticon. Alternatively, one can attach the sound file to the message, and the step of forwarding can comprise forwarding both the message and the sound file.

It should be understood that the step of linking or associating a sound file can comprise creating a pointer or hash key to a sound file and attaching the pointer or hash key to the message. As contemplated herein, the present invention can include, for example, forwarding a MIME-encoded attachment as a manner of associating or linking the sound file with an emoticon.

It should be understood that the invention can encompass schemes in which the sender forwards a sound file, regardless of whether the recipient already has that particular sound file. It should also be understood that the invention can encompass schemes in which the communications system compares the sound file to be forwarded with sound files already contained at the server or at the recipient to determine whether to forward the sound file from the sender to the server and/or from the server to the recipient. In this way, data traffic associated with forwarding and playing of the audio file can be minimized.

The present invention will be better understood upon reading the following specification in conjunction with the accompanying drawing figures.

DETAILED DESCRIPTION OF THE EXEMPLARY EMBODIMENTS

Figure 1:
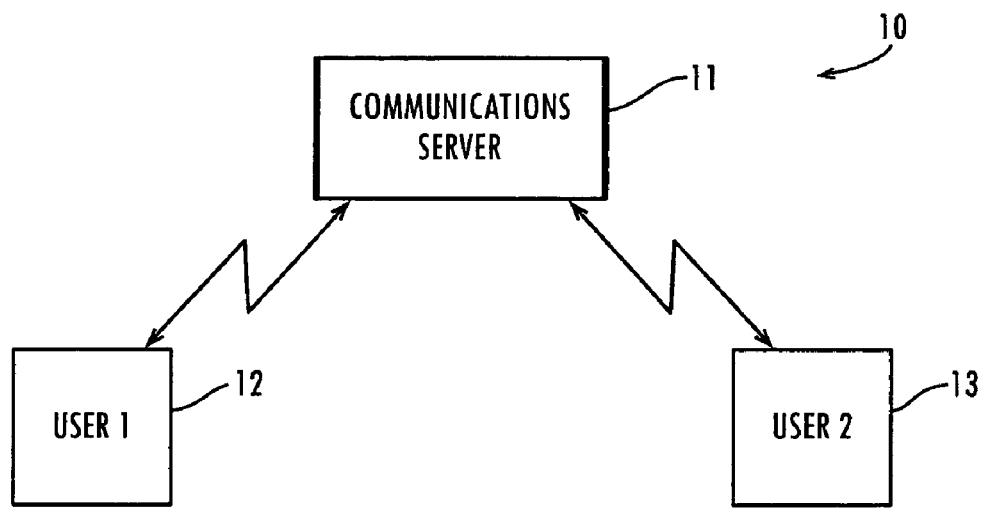
FIG. 1 is a schematic block diagram of a communications system environment which can be used with the present invention.

Referring now to the drawing figures, wherein like reference numerals represent like parts throughout the several views, FIG. 1 shows a communications network 10 suitable for use with the present invention. It should be understood that a wide variety of communication networks, employing a wide variety of devices, can utilize and benefit from the present invention. For example, the present invention can be utilized in e-mail applications existing on personal computers communicating with one another. Also, the present invention can be employed in communications between a personal computer and a wireless device or vice versa. Indeed, a wide variety of devices can enjoy the benefits of this technology, including personal computers, personal digital assistants (PDA's), wireless and cellular phones, pagers, Internet appliances, etc. In particular, the invention can be employed in scenarios having recipient devices that are the same or are of a different type or configuration than the sending devices. A great many such communications networks exist already and can readily exploit the present invention. Typically, such communications networks would include a communications server or network server 11 for facilitating communication between users of the network, such as User 1 and User 2 indicated at 12 and 13.

Figure 2:
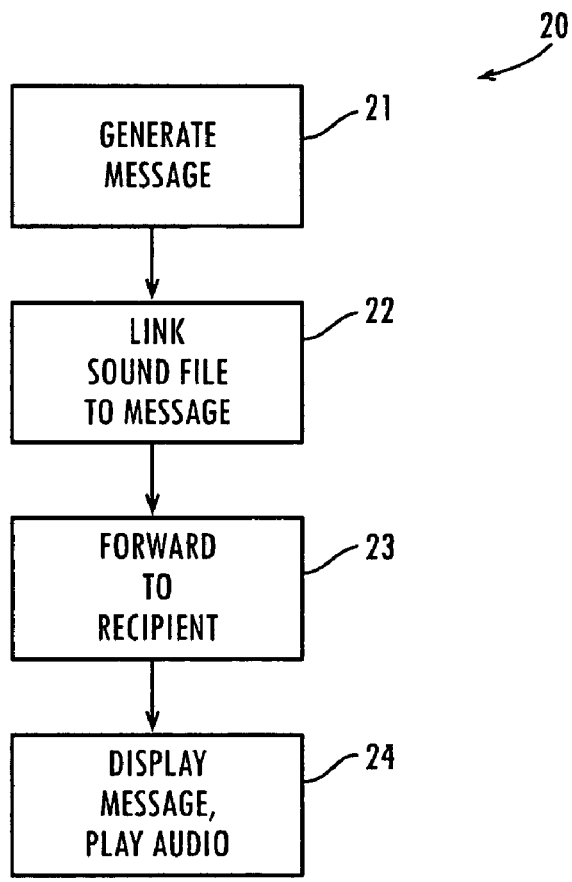
FIG. 2 is a flowchart depicting the steps carried out in one aspect of the present invention.

FIG. 2 is a flowchart depicting a first aspect of the present invention. In particular, FIG. 2 depicts a method 20 for carrying out the present invention. The method includes a first step 21 of generating a message. This message generation step 21 typically would be carried out by a user, such as User 1 indicated at 12 in FIG. 1. The message generation step 21 is followed by a linking step indicated at 22, in which a sound file is linked to the message. The step of linking or associating a sound file can take several forms, and can, for example, comprise creating a pointer or hash key to a sound file and attaching the pointer or hash key to the message. This linking step can be performed by the user, such as by manually creating a link (such as by keyboard strokes or mouse pointer selections). Alternatively, this linking step can be performed automatically by the device being used by the user. Thus, the device, such as a computer, cellular telephone, PDA, etc., can be programmed to automatically create the link for the user. Alternatively, this link can be created outside of the user's device, such as at the network server 11 in the communications network 10 depicted in FIG. 1.

As contemplated herein, the linking step can also include, for example, physically attaching a sound file to the message file, such as by forwarding a MIME-encoded attachment. (MIME stands for Multipurpose Internet Mail Extensions.) A MIME-encoded attachment is a file attachment in a format that is created by some e-mail programs to encapsulate image or program attachments. The Internet's e-mail system doesn't always handle binary files well, such as image files. So, for example when an e-mail message is to be sent with a file attachment to someone over the Internet, some software programs automatically encode or translate the attachment using a system called MIME. Typically, a MIME program converts the binary attachment into a text format that can be handled by Internet e-mail. The message's recipient needs a program that can decode the MIME e-mail and turn it back into a binary file that the computer can use. While a MIME-encoded attachment is described herein, the invention is not to be limited to such communication techniques.

After the linking step, the next step 23 comprises forwarding the message to the recipient. Typically, this would be carried out by first forwarding the message from the User 1 to a communications server and having the communications server forward the message on to the ultimate recipient user (e.g., User 2). In one manner of practicing the invention, this forwarding step 23 comprises forwarding both the message and a link (or hash key or pointer) to a sound file without actually sending the sound file. In another aspect, the present invention encompasses also sending the sound file. Alternatively, the message and sound file can be combined in a MIME-encoded attachment and then forwarded together. In step 24, the message is received at the end user and is displayed on whatever display device the end user has, be it a computer screen, PDA, cellular telephone, pager, Internet appliance, etc. Along with the displaying of the message and the emoticon or emoticon symbol, the device also plays the audio file that has been linked to the emoticon.

The invention as disclosed herein preferably involves the creation of a link or association between the emoticon and a sound file. This can be done more or less automatically. For example, the communications server can be programmed to link a particular sound file with a particular emoticon for every sender. Alternatively, the server can be programmed to allow different sound files to be associated with the same emoticon, depending upon the preferences of the sender. Thus, a first sender or user can choose a particular sound file to be associated or linked with an emoticon, while a different sender or user can choose a different sound file to be automatically associated or linked with an emoticon anytime that particular sender sends a message containing that emoticon.

Thus, as just described above, the linking or association can be made dynamically or automatically. The linking step 22 can be done by the end user or sender, can be made automatically at the sender's device prior to uploading it along with the message containing the emoticon to a network server, or can be made at the network server. In one form, the step 22 of linking comprises making a dynamic association, established by the sender, for that particular message being sent. In another form the step of linking comprises automatically generating a link according to the particular emoticon being sent. In yet another form the step of linking comprises automatically generating a link according to the combination of the particular emoticon being sent and the particular recipient.

It should be understood that the invention can encompass schemes in which the sender forwards a sound file, regardless of whether the recipient already has that particular sound file. It should also be understood that the invention can encompass schemes in which the communications system compares the sound file to be forwarded with sound files already contained at the server or at the recipient to determine whether to forward the sound file from the sender to the server and/or from the server to the recipient. In this way, data traffic associated with forwarding and playing of the audio file can be minimized. One way of evaluating the "need" for the sound file to be forwarded so as to minimize data traffic is depicted in FIG. 3.

Figure 3:
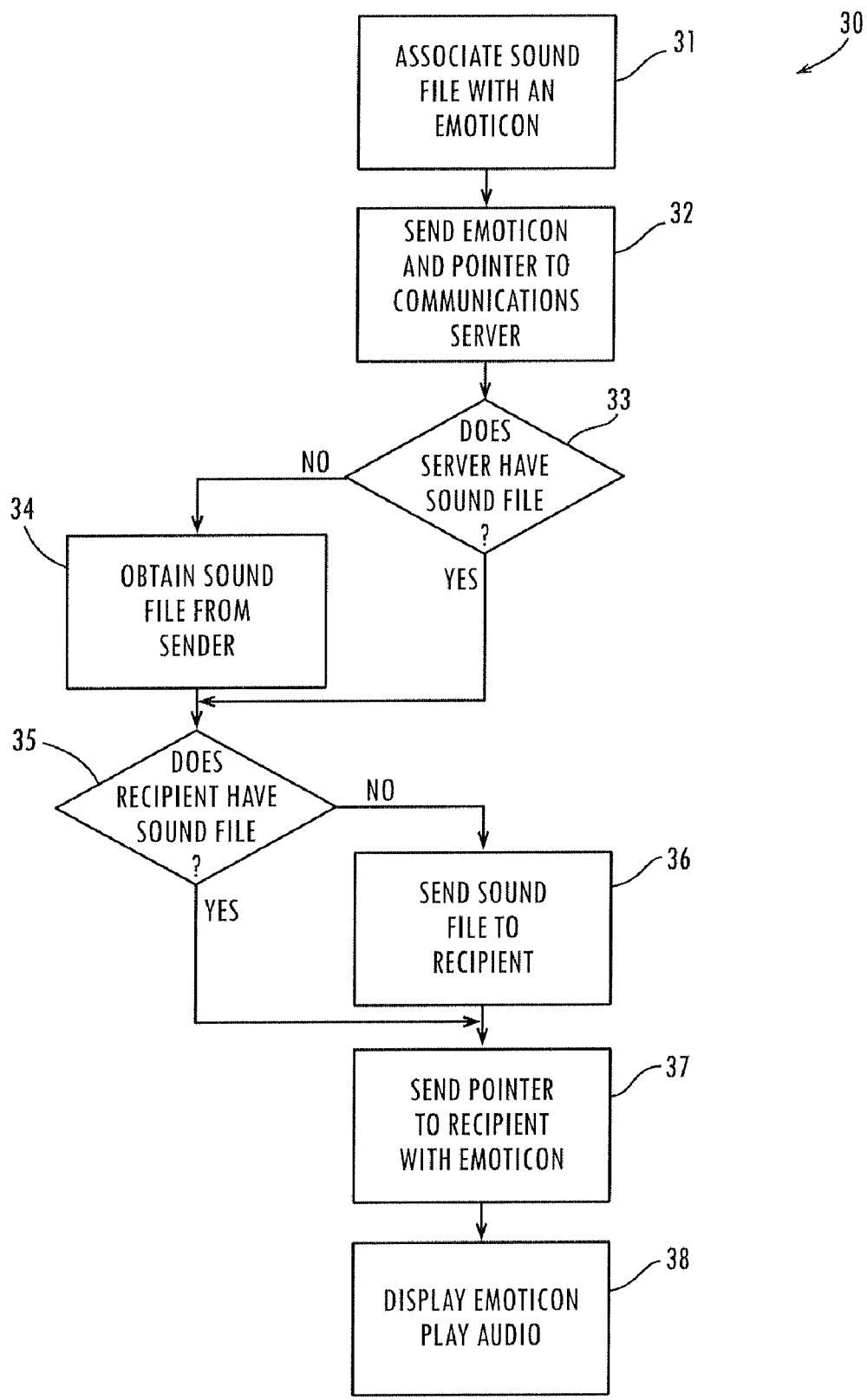
FIG. 3 is a flowchart depicting steps carried out in another aspect of the present invention.

In FIG. 3, another aspect of the present invention is depicted. In particular, FIG. 3 depicts a method 30 including an initial step 31 of associating or linking a sound file with an emoticon. Preferably, this association takes the form of a pointer or hash key to relate an emoticon to a separate sound file. In the second step 32, the emoticon and the pointer or hash key are forwarded from the first user or sender to a communications server. However, initially, the sound file itself need not be forwarded. Instead, in step 33 the server evaluates whether it already has the particular sound file that would otherwise be forwarded with the emoticon forwarded in step 32. If the server does not have the sound file, the server obtains the sound file from the sender according to step 34. This typically would be done by sending a short signal back to the sender to, in effect, pull the sound file from the sender, by in practical terms asking the sender to forward the sound file to the network server. On the other hand, if the server already has the sound file, there is no need to perform step 34, and instead the method branches directly to step 35. In step 35, the server queries the end user and evaluates whether the end user or recipient has the particular sound file linked to the emoticon. If the end user or recipient does not have the sound file, step 36 is performed in which the sound file is forwarded from the server to the recipient. If, on the other hand, the recipient already has the sound file, there is no need to send it again. The next step 37 involves sending the pointer to the recipient along with the emoticon and message. In step 38, the end user's or recipient's device displays the emoticon, either as a graphical representation or as text characters. In addition, the end user device also plays the audio, using the sound file linked or associated with the message an emoticon.

As an alternative to moving directly to step 34 if a determination is made at step 33 that the server does not have the sound file, a determination could first be made as to whether the recipient has the sound file. If so, it would not be necessary to obtain the sound file from the sender at that time. If it is determined that neither the server nor the recipient have the sound file, then the sound file would be obtained from the sender. In essence, the order of blocks 35 and 34 could be reversed in the flow chart. As another alternative, the server could have knowledge of which sound files the recipient has so that if the server does not have the sound file, the server determines, at the server, whether the recipient has the sound file. If neither the server nor the recipient have the sound file, then the sound file is obtained from the sender.

Figure 4:
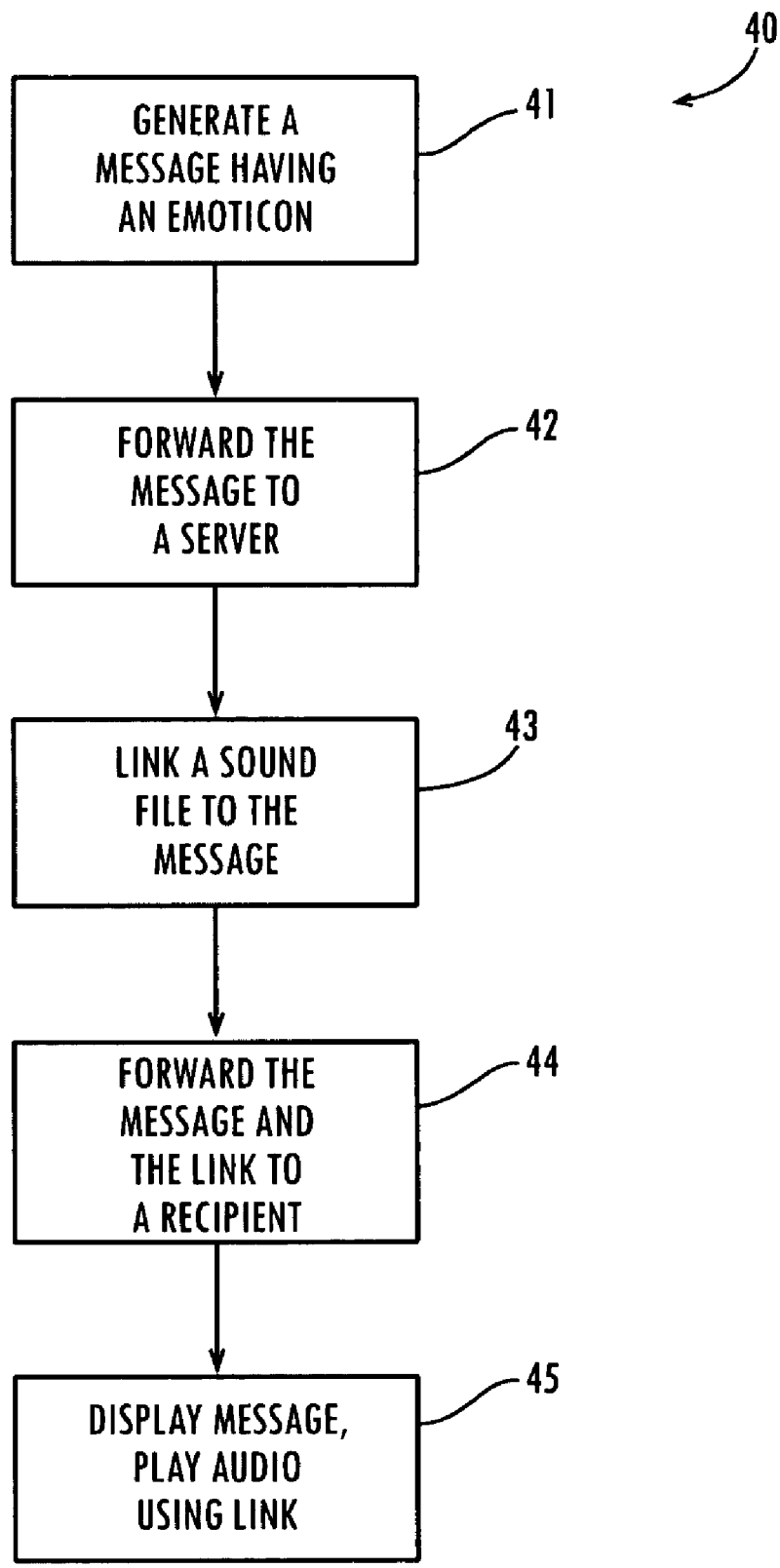
FIG. 4 is a flowchart depicting steps carried out in yet another aspect of the present invention.

Preferably, the linking or associating or otherwise relating the sound file to an emoticon contained the message is accomplished by the sender or at the sender's electronic device. However, it may be preferable in certain circumstances to effect this linking at the network server, rather than at the user device. This might be particularly advantageous where the end user is a subscriber to a service, such as a cellular telephone service subscriber and his or her user preferences can be, and typically are, stored on a central system, rather than being stored on the cellular telephone itself. FIG. 4 shows, in schematic manner, one way of practicing the present invention in which this linking or associating step is carried out at the network server. As depicted in FIG. 4, a method 40 according to the present invention includes a first step 41 of generating a message, with the message including an emoticon. This message generation step 41 typically would be carried out in an end user or sender device. Next, in step 42 the message with the emoticon is forwarded from the sender to the network server. Upon receiving the message from the sender, the network server creates a link to the sound file in step 43, with the link associating a sound file with the particular message. Once the sound file has been linked to the message in step 43, in step 44 the message and the link are then forwarded from the network server to the recipient. Finally, in step 45 the recipient's device displays the message and plays the audio file using the link between the emoticon and the audio file. In embodiments of the present invention, the steps of this method may be executed by a computer program on a computer-readable medium.

The approach depicted in FIG. 4 has certain practical advantages as well. For example, in the context of a cellular telephone subscriber, user preferences can be stored on central server and periodically updated by the user. In this way, a user can initially have a set of default audio files that he or she can easily associate or link with certain emoticons. Indeed, the default values can associate particular audio files with each of the somewhat standard emoticons. If the user doesn't change the default, the default remains in place. The end user can purchase or otherwise obtain additional or different audio files to replace the default audio files. This approach could be used advantageously to limit the amount of network storage space required for the audio files. For example, the network server need not physically store 1,000 copies of a particular audio file to correspond to thousand different users who all have the same default value audio file. Instead, the network server can simply store one copy of the audio file and make it accessible to all of the users.

Figure 5:
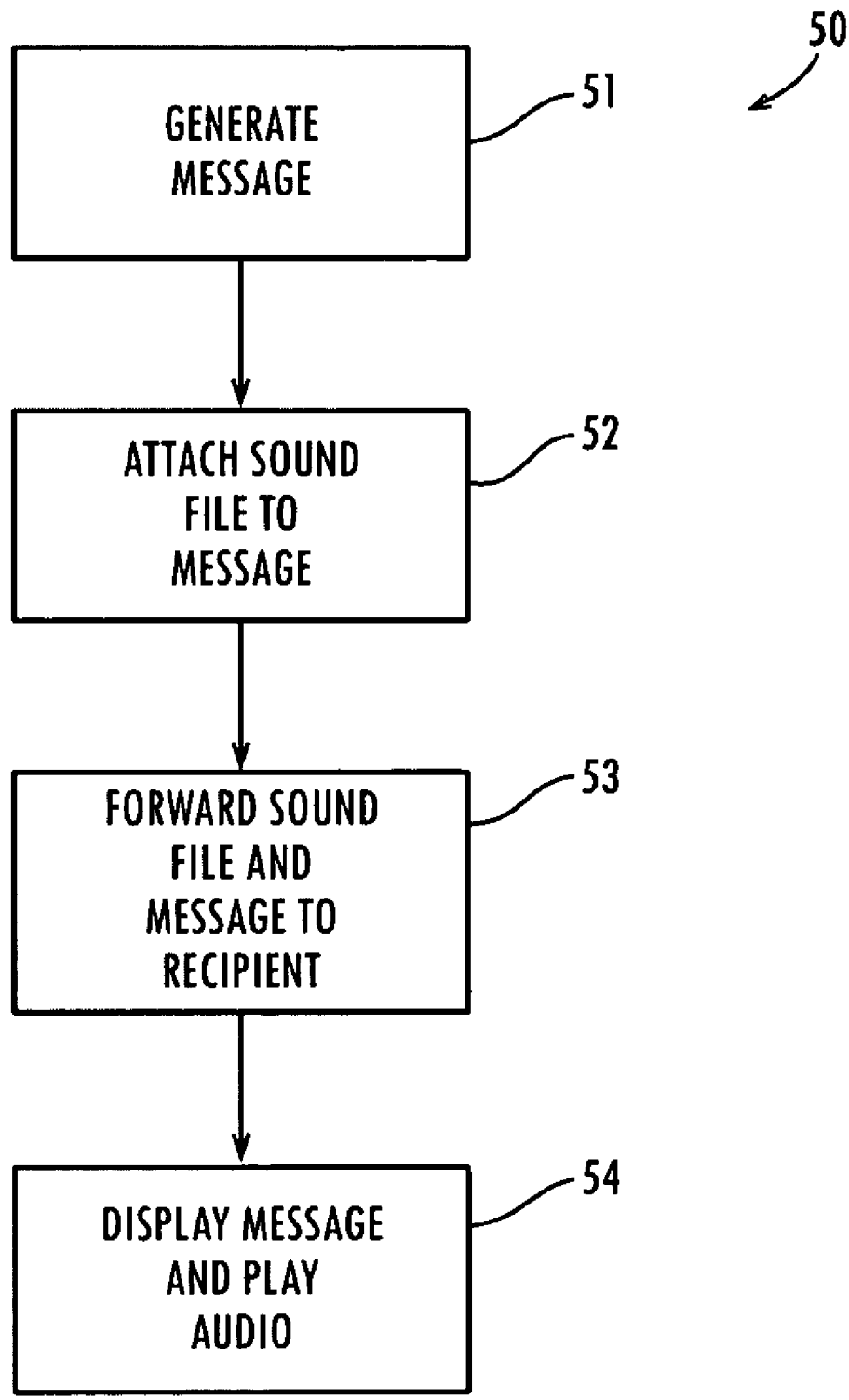
FIG. 5 is a flowchart depicting steps carried out in a further aspect of the present invention.

FIG. 5 shows another method 50 for practicing the present invention. In this embodiment, the linking or association takes the form of physically attaching the sound file to the message and then forwarding them together as a packet. The first step 51 comprises generating a message, typically at the user or sender device. Next, in step 52 a sound file is attached to the message file, with the sound file to be played later when the emoticon contained in the message is displayed. One suitable approach for making this attachment is to attach the sound file as a MIME-encoded attachment which can be forwarded with the message text file. In step 53 the text file or message file and its associated attachment sound file are forwarded to the recipient. Step 53 can be carried out directly in that the message can go directly from the first user to the second user. Alternatively, the forwarding can be somewhat indirect in that the message can be forwarded first from the sender to a network server and then from the network server to the recipient. Alternatively, the message can be sent from the sender to some third party device other than a network server and then forwarded from that device on to the ultimate end user or recipient. In step 54 the message received by the recipient is displayed, including the emoticon, and the audio attachment is played so that the end user sees the message with the embedded emoticon and hears the audio.

Figure 6:
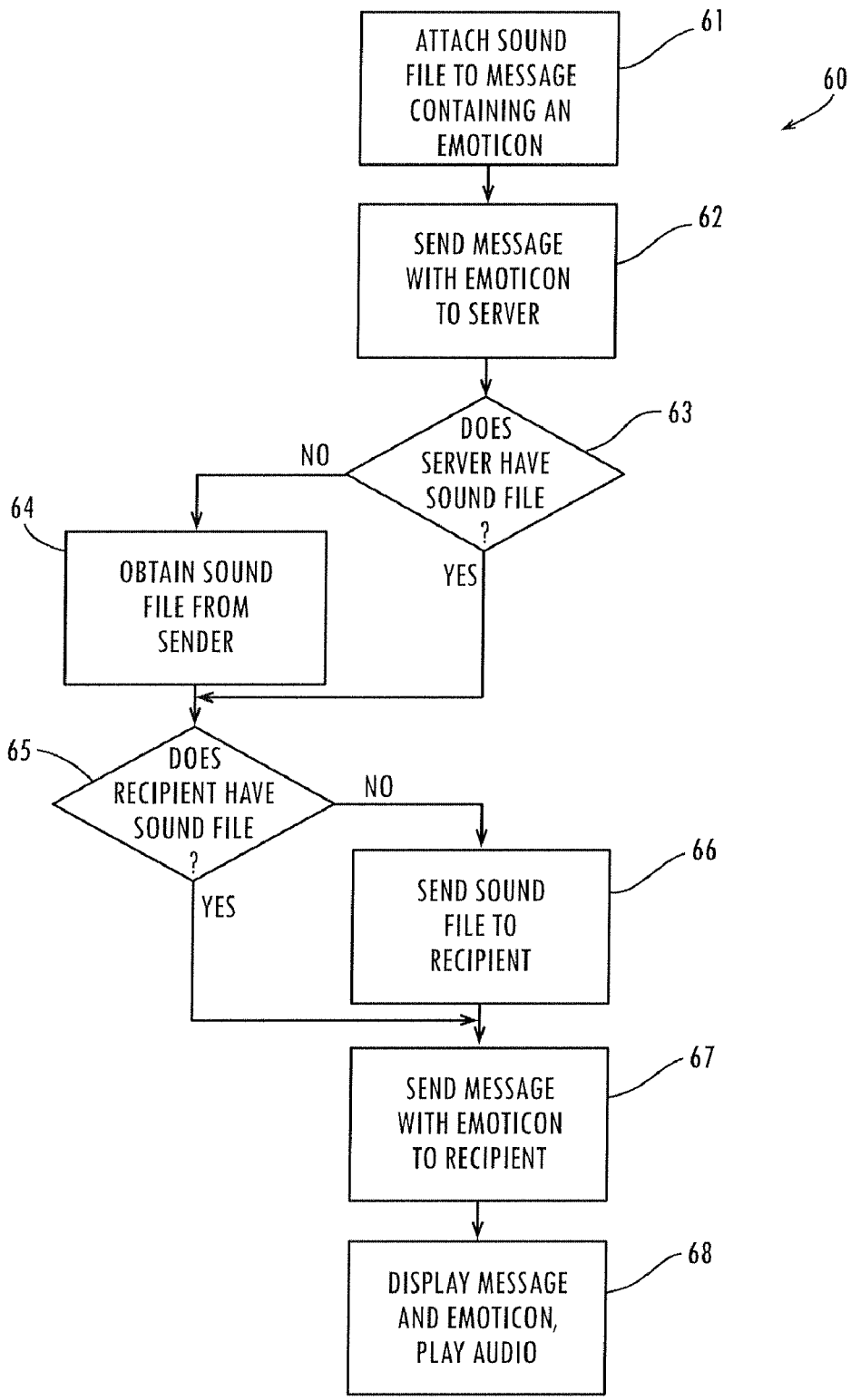
FIG. 6 is a flowchart depicting steps carried out in yet another aspect of the present invention.

FIG. 6 shows another method 60 for practicing the present invention. In this embodiment, the linking or association is performed at the sender's device and takes the form of physically attaching the sound file to the message and then forwarding them together as a packet. In FIG. 6, the first step 61 comprises attaching the sound file to the message file. This attachment can be done using a MIME-encoded attachment technique, as described above. In the second step 62, the emoticon and the pointer or hash key are forwarded from the first user or sender to a communications server. However, initially, the sound file itself need not be forwarded. Instead, in step 63 the server evaluates whether it already has the particular sound file that would otherwise be forwarded with the emoticon forwarded in step 62. If the server does not have the sound file, the server obtains the sound file from the sender according to step 64. This typically would be done by sending a short signal back to the sender to, in effect, pull the sound file from the sender, by in practical terms asking the sender to forward the sound file to the network server. On the other hand, if the server already has the sound file, there is no need to perform step 64 and instead the method branches directly to step 65. In step 65 the server queries the end user and evaluates whether the end user or recipient has the particular sound file linked to the emoticon. If the end user or recipient does not have the sound file, step 66 is performed in which the sound file is forwarded from the server to the recipient. If, on the other hand, the recipient already has the sound file, there is no need to send it again. The next step 67 involves sending a pointer (in lieu of the sound file itself) to the recipient along with the emoticon and message. In step 68, the end user's or recipient's device displays the emoticon, either as a graphical representation or as text characters. In addition, the end user device also plays the audio file, using the sound file linked and forwarded with the message and emoticon (or using the sound file already resident on the recipient device).

While the invention has been disclosed in preferred forms, those skilled in the art will recognize that many modifications, additions and deletions can be made therein without departing from the spirit and scope of the invention as set forth in the following claims.

We claim:

1. A method of using an electronic communications network, in which a sender sends a message to a recipient, the network including a server for facilitating communications between the sender and the recipient, the method comprising the steps of:
    linking a sound file to an emoticon contained in a sender-generated message by creating a pointer to the sound file and attaching the pointer to the sender-generated message;
    determining by the server if the recipient already has the sound file by querying the recipient and evaluating whether or not the recipient has the sound file, and if not sending the sound file to the recipient;
    forwarding the sender-generated message, the emoticon, and the pointer to the sound file to the recipient, the pointer to the sound file associated with the emoticon; and
    at the recipient, displaying the sender-generated message and the emoticon, and audibly playing the sound file linked to the emoticon,
    wherein the linking occurs at the server according to a user preferences stored on the server where the user preferences indicates that the sound file is chosen to be linked with the emoticon by the sender and is periodically updated by the sender, the updating occurring by obtaining different sound files from the server and replacing one or more of a set of default sound files, linked with one or more emoticons, stored in the user preferences.

2. The method as claimed in claim 1 wherein the step of linking comprises making a dynamic association, established by the sender, for a particular message being sent.

3. The method as claimed in claim 1 wherein the step of linking comprises automatically generating a link according to a particular emoticon being sent.

4. The method as claimed in claim 1 wherein the step of linking comprises automatically generating a link according to the combination of a particular emoticon being sent and a particular recipient.

5. The method as claimed in claim 1 wherein the step of linking comprises attaching the sound file to the message, and wherein the step of forwarding comprises forwarding both the message and the sound file.

6. The method as claimed in claim 5 wherein the step of forwarding comprises forwarding the sound file in a MIME-encoded attachment.

7. A system for use in an electronic communications network, in which a sender sends a message to a recipient, the network including a server for facilitating communications between the sender and the recipient, the system comprising:
    the sender comprising a computer and in electronic communication with the server;
    the server including:
        a first logic configured to link a sound file to an emoticon contained in a sender-generated message by creating a pointer to the sound file and attaching the pointer to the sender-generated message;
        second logic configured to forward the sender-generated message, the emoticon and the pointer to the sound file to the recipient, the pointer to the sound file associated with the emoticon; and
        third logic configured to determine if the recipient already has the sound file by querying the recipient and evaluating whether or not the recipient has the sound file, and if not, send the sound file to the recipient; and
    the recipient including fourth logic configured to display the sender-generated message and the emoticon, and audibly play the sound file linked to the emoticon,
    wherein the linking occurs at the server according to user preferences stored on the server where the user preferences indicates that the sound file is chosen to be linked with the emoticon by the sender and is periodically updated by the sender, the updating occurring by obtaining different sound files from the server and replacing one or more of a set of default sound files, linked with one or more emoticons, stored in the user preferences.

8. The apparatus as claimed in claim 7, wherein the first logic performs the linking using dynamic association, established by the sender, for a particular message being sent.

9. The apparatus as claimed in claim 7, wherein the first logic performs linking by automatically generating a link according to a particular emoticon being sent.

10. The apparatus as claimed in claim 7, wherein the first logic performs linking by automatically generating a link according to the combination of a particular emoticon being sent and a particular recipient.

11. The apparatus as claimed in claim 7, wherein the first logic performs linking by attaching the sound file to the message, and wherein the second logic forwards both the message and the sound file.

12. The apparatus as claimed in claim 11, wherein the second logic forwards the sound file in the form of an MIME-encoded attachment.

13. A non-transitory computer-readable medium encoded with a computer program that, when executed by a server, causes linking of an emoticon to a sound file, the computer-readable medium comprising:
    first instructions for linking an emoticon to a particular sound file contained in a sender-generated message by creating a pointer to the sound file and attaching the pointer to the sender-generated message;
    second instructions for causing the sender-generated message, the emoticon, and the pointer to the sound file to be forwarded to the recipient; and
    third instructions for determining if the recipient already has the sound file by querying the recipient and evaluating whether or not the recipient has the sound file, and if not sending the sound file to the recipient;
    wherein the linking occurs at the server according to user preferences stored on the server where the user preferences indicates that the sound file is chosen to be linked with the emoticon by the sender and is periodically updated by a sender, the updating occurring by obtaining different sound files from the server and replacing one or more of a set of default sound files, linked with one or more emoticons, stored in the user preferences,
    wherein the recipient displays the sender-generated message and the emoticon, and audibly plays the sound file linked to the emoticon.

* * * * *